US007634961B2

(12) United States Patent
Asakage et al.

(10) Patent No.: US 7,634,961 B2
(45) Date of Patent: Dec. 22, 2009

(54) HYDRAULIC CIRCUIT FOR CONSTRUCTION MACHINE

(75) Inventors: Tomohiko Asakage, Hiroshima (JP); Yutaka Toji, Hiroshima (JP); Masaaki Tachino, Hiroshima (JP); Kazuhiko Fujii, Hiroshima (JP)

(73) Assignee: Kobelco Construction Machinery Co., Ltd., Hiroshima-shi (JP)

( * ) Notice: Subject to any disclaimer, the term of this patent is extended or adjusted under 35 U.S.C. 154(b) by 335 days.

(21) Appl. No.: 11/573,108

(22) PCT Filed: Sep. 21, 2005

(86) PCT No.: PCT/JP2005/017393

§ 371 (c)(1),
(2), (4) Date: Feb. 2, 2007

(87) PCT Pub. No.: WO2006/035648

PCT Pub. Date: Apr. 6, 2006

(65) Prior Publication Data

US 2007/0277883 A1 Dec. 6, 2007

(30) Foreign Application Priority Data

Sep. 29, 2004 (JP) ............................ 2004-284805
Aug. 11, 2005 (JP) ............................ 2005-232937

(51) Int. Cl.
*F15B 11/08* (2006.01)
*F16D 31/02* (2006.01)

(52) U.S. Cl. .......................................... 91/461; 60/494

(58) Field of Classification Search .................. 60/468, 60/494; 91/461
See application file for complete search history.

(56) References Cited

U.S. PATENT DOCUMENTS 4,802,336 A * 2/1989 Mayr et al. .................. 60/452
5,081,905 A * 1/1992 Yagyu et al. .................. 91/461

FOREIGN PATENT DOCUMENTS

| | | |
|---|---|---|
| JP | 55 20707 | 2/1980 |
| JP | 59 105601 | 7/1984 |
| JP | 2 66705 | 5/1990 |
| JP | 5 17970 | 1/1993 |
| JP | 6 300006 | 10/1994 |
| JP | 8 326708 | 12/1996 |
| JP | 9 235756 | 9/1997 |
| JP | 2001 208005 | 8/2001 |
| JP | 2002 5109 | 1/2002 |
| JP | 2004 263749 | 9/2004 |

OTHER PUBLICATIONS

U.S. Appl. No. 12/399,813, filed Dec. 19, 2008, Saotome, et al.

* cited by examiner

*Primary Examiner*—Michael Leslie
(74) *Attorney, Agent, or Firm*—Oblon, Spivak, McClelland, Maier & Neustadt, L.L.P.

(57) ABSTRACT

A hydraulic circuit including a first throttle disposed upstream of pressure-reducing valves of a remote-control valve, which operates a control valve of hydraulic pilot type, so as to reduce primary pressures supplied from a pilot pump to the pressure-reducing valves. Bleed-off lines connect pilot lines to tanks. Second throttles are disposed on the bleed-off lines, respectively, so as to moderate rises in the pilot pressures supplied to pilot ports of the control valve. The hydraulic circuit prevents detrimental effects such as deterioration of operability while ensuring shock absorption during quick operation.

1 Claim, 13 Drawing Sheets

HYDRAULIC CIRCUIT FOR CONSTRUCTION MACHINE

TECHNICAL FIELD

The present invention relates to hydraulic circuits for construction machines such as hydraulic shovels whose hydraulic actuators are operated by control valves using remote-control valves.

BACKGROUND ART

When remote-control valves in construction machines of this type are quickly operated, pilot pressures output from pressure-reducing valves of the remote-control valves suddenly changes and a surge in pressure occurs in pilot lines. This causes quick operation or control valves and generates shock.

To solve this problem, a technology described in Patent Document 1 is well known.

This will be illustrated in FIG. 18 that is newly drawn for comparison.

Reference numbers 1, 2, and 3 denote a hydraulic actuator (a hydraulic motor as an example thereof), a hydraulic pump serving as a hydraulic sources and a control valve of the hydraulic pilot type that controls the operation of the hydraulic actuator 1 respectively. Pilot lines 4 and 5 are connected to pilot ports 3*a* and 3*b*, respectively, at either end of the control valve 3.

A remote-control valve 6 operates the control valve 3, and downstream-pressure (secondary-pressure) lines 7*a* and 8*a* of a pair of pressure-reducing valves 7 and 8, respectively, of the remote-control valve 6 are connected to the pilot lines 4 and 5, respectively. The downstream pressures of the pressure-reducing valves 7 and 8 according to operation amounts to a lever 9 are supplied to the control valve 3 via the pilot lines 4 and 5, respectively. Reference number 10 denotes a pilot pump serving as a hydraulic source for the remote-control valve 6 (both the pressure-reducing valves 7 and 8).

In this technology (hereinafter referred to as a known technology), first throttles 11 and 12 are disposed on the pilot lines 4 and 5, respectively. Moreover, bleed-off lines 13 and 14 are branched from the pilot lines 4 and 5 downstream of the first throttles 11 and 12, respectively, and communicate with tanks T. Second throttles 15 and 16 are disposed on the bleed-off lines 13 and 14, respectively.

With this structure, the absolute values of the downstream pressures (pilot pressures supplied to the control valve 3) output from the pressure-reducing valves 7 and 8 are reduced by the first throttles 11 and 12, and at the same time, rises in the pilot pressures are moderated by the second throttles 15 and 16. With this, a surge in pressure in the pilot lines 4 and 5 during quick operation is prevented, and the shock is moderated.

Patent Document 1: Japanese Unexamined Patent Application Publication No. 2001-208005

DISCLOSURE OF INVENTION

However, according to the above-described known technology, the downstream pressures output from the pressure-reducing valves 7 and 8 are reduced by the first throttles 11 and 12, and then sent to the control valve 3 as pilot pressures. Therefore, lever operation/valve stroke characteristics set for the remote-control valve 6 and the control valve 3 are warped, and the hydraulic actuator 1 cannot be operated accurately as an operator desires, resulting in poor operability.

To solve this problem, the downstream pressures of the pressure-reducing valves 7 and 8 can be set relatively high in view of the reduction in the pressures to be achieved by the first throttles 11 and 12.

However, this leads an increase in an upstream pressure (a primary pressure; discharge pressure of the pilot pump 10), and thus leads to an energy loss. Moreover, this exerts detrimental effects on characteristics of other plot circuits since the pilot pump 10 is usually shared with the other pilot circuits. Thus the above-described proposed solution creates new problems to be solved and is not expedient.

Accordingly, the present invention provides a hydraulic circuit for a construction machine capable of ensuring shock absorption during quick operation while preventing detrimental effects such as deterioration of operability.

In order to solve the above-described problems, the present invention includes the following structure.

That is, a hydraulic circuit for a construction machine includes a hydraulic actuator; a control valve of a hydraulic pilot type, the control valve controlling the operation of the hydraulic actuator; at least one pilot line guiding a pilot pressure to at least one pilot port of the control valve; at least one pressure-reducing valve supplying a downstream pressure according to an operation amount of operating means to the pilot line as a pilot pressure; a pilot hydraulic source serving as an upstream-pressure source of the pressure-reducing valve; a first throttle disposed upstream of the pressure-reducing valve for reducing the upstream pressure that is supplied from the pilot hydraulic source to the pressure-reducing valve; a bleed-off line connecting the pilot line with a tank; and a second throttle disposed in the bleed-off line for moderating a rise in the pilot pressure that is supplied to the pilot port of the control valve.

According to the present invention, the absolute value of the pilot pressure is regulated by the first throttle, and at the same time, a rise in the pilot pressure is moderated by the second throttle. The combination of these can prevent a surge in pressure during quick operation and the shock caused by the quick operation of the hydraulic actuator.

Furthermore, unlike the known technology in which the downstream pressures of the pressure-reducing valves are reduced, the upstream pressure is reduced by the first throttle disposed in the upstream-pressure line of the pressure-reducing valve such that the absolute value of the pilot pressure is regulated. Thus, deterioration of operability caused when the downstream pressure is reduced, energy losses caused when the upstream pressure is increased so as to prevent the deterioration, or harmful influences on the other pilot circuits can be prevented.

That is, all detrimental effects can be prevented while ensuring expected shock-absorption function.

BEST MODE FOR CARRYING OUT THE INVENTION

Embodiments of the present invention will now be described with reference to FIGS. 1 to 17.

Figure 1:
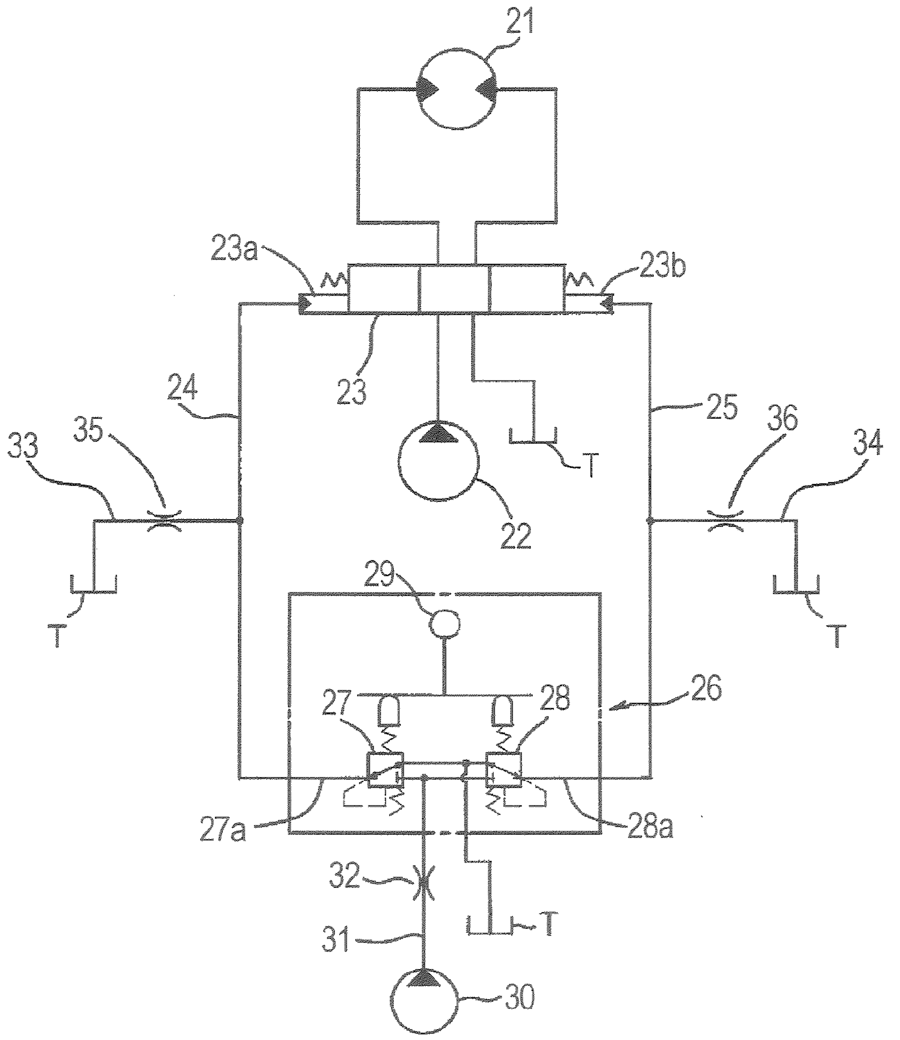
FIG. 1 is a circuit structure illustrating a first embodiment of the present invention.
Figure 2:
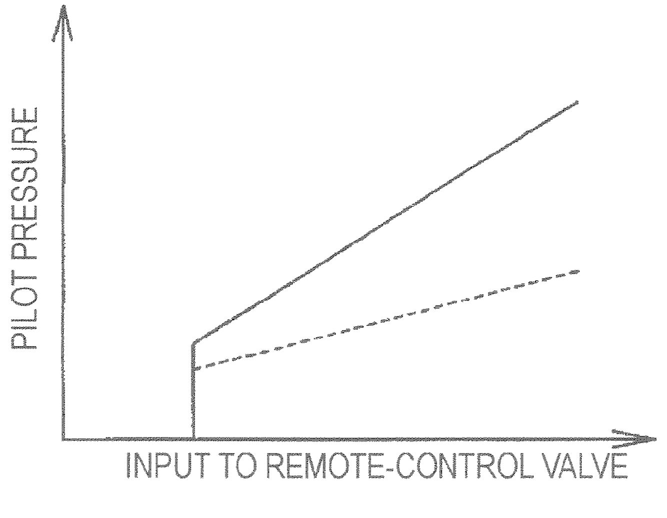
FIG. 2 illustrates the relationship between an operation amount of a remote-control valve according to the first embodiment and a pilot pressure.
Figure 3:
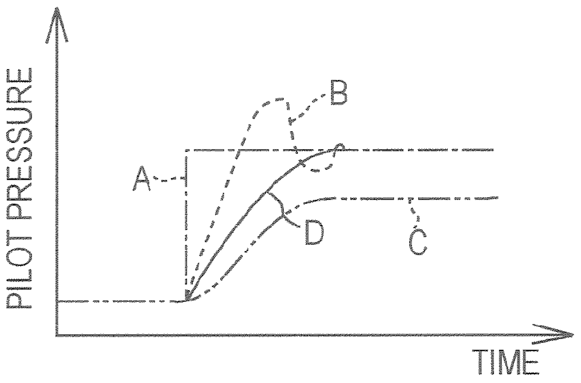
FIG. 3 illustrates a change in pilot pressure according to the first embodiment.

First Embodiment (see FIGS. 1 to 3)

In FIG. 1, reference numbers 21, 22, and 23 denote a hydraulic actuator (a hydraulic motor as an example thereof) a hydraulic pump serving as a hydraulic source, and a control valve of the hydraulic pilot type that controls the operation of the hydraulic actuator 21, respectively. Pilot lines 24 and 25 are connected to pilot ports 23*a* and 23*b*, respectively, at either end of the control valve 23 for guiding pilot pressures.

A remote-control valve 26 operates the control valve 23, and downstream-pressure lines 27*a* and 28*a* of a pair of pressure-reducing valves 27 and 28, respectively, of the remote-control valve 26 are connected to the pilot lines 24 and 25, respectively. The downstream pressures of the pressure-reducing valves 27 and 28 according to operation amounts to a lever 20 serving as operating means are supplied to the control valve 23 via the pilot lines 24 and 25, respectively, as pilot pressures. Reference number 30 denotes a pilot pump (pilot hydraulic source) serving as a hydraulic source for the remote-control valve 26 (both the pressure-reducing valves 27 and 28).

In this embodiment, a first throttle 32 is disposed on a pump line 31 (upstream of the pressure-reducing valves 27 and 28) that transmits the upstream pressure from the pilot pump 30 to the pressure-reducing valves 27 and 28. Moreover, bleed-off lines 33 and 34 are branched from the pilot lines 24 and 25, and communicate with tanks T. Second throttles 35 and 36 are disposed on the bleed-off lines 33 and 34, respectively.

With this structure, the absolute value of the upstream pressure input to the pressure-reducing valves 27 and 28 is reduced by the first throttle 32, and at the same time, rises in the pilot pressures input to the control valve 23 are moderated by the second throttles 35 and 36. The combination of these two effects can prevent a surge in pressure in the pilot lines 24 and 25 during quick operation, and can moderate the resulting shock.

Figure 18:
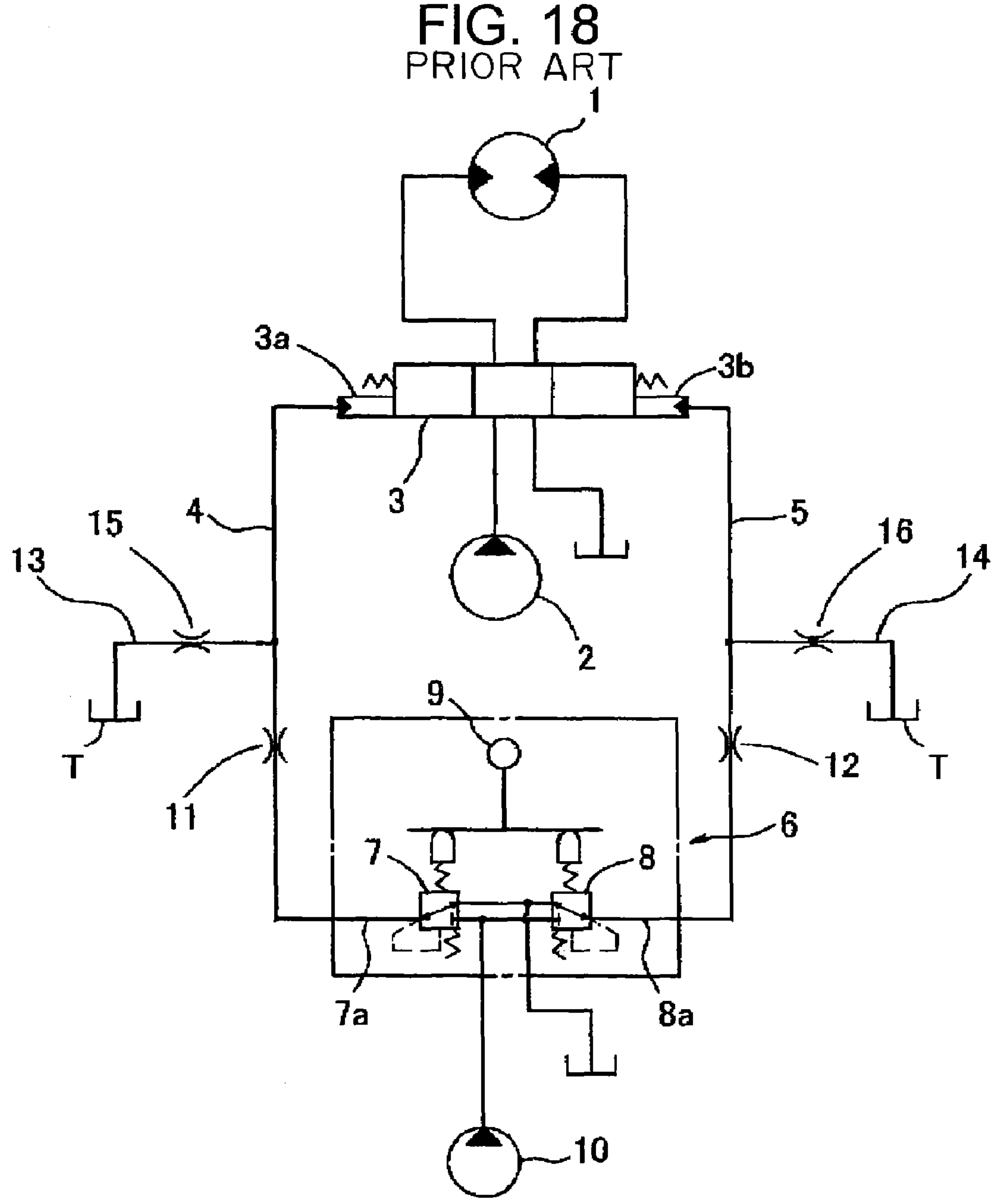
FIG. 18 PRIOR ART
FIG. 18 is a circuit structure according to a known technology.

In this case, unlike the known technology shown in FIG. 18 in which the downstream pressures of the pressure-reducing valves 7 and 8 are reduced, the upstream pressures of the pressure-reducing valves 27 and 28 are reduced such that the absolute value of the pilot pressure is regulated. Therefore, the lever operation/valve stroke characteristics set for the remote-control valve 26 and the control valve 23 can be used without being warped compared with the known technology.

FIG. 2 illustrates the relationship between an operation amount of the remote-control valve (control input through the lever of the remote-control valve 26) and the pilot pressure (the first embodiment of the present invention is indicated by a solid line, and the known technology is indicated by a broken line). As shown in the drawing, the pilot pressure with respect to the control input becomes lower than a predetermined level in the known technology. Thus, the actuator cannot be operated as an operator desires, resulting in poor operability.

In contrast, according to the first embodiment of the present invention, the pilot pressure that is set in accordance with the relationship between the pilot pressure and the control input is sent to the control valve 23 without being changed. Thus, an excellent operability can be ensured.

FIG. 3 illustrates changes in pilot pressures with respect to time during quick operation. Line A formed of an alternate long and short dashes is the target characteristic, line B which is a broken line is a characteristic observed when no measures are applied, line C which is a two-dot chain line is the characteristic according to the known technology, and line D which is a solid line is the characteristic according to the first embodiment of the present invention.

As shown in the drawing, when no measures are adopted (B), a surge in the pilot pressure with a high absolute value and a steep rise occurs. Moreover, some time is required before the pilot pressure converges on the target value (A).

Moreover, according to the known technology (C), the rise in the pilot pressure is moderated, and a surge in pressure can be regulated. However, the absolute value of the pilot pressure becomes too low.

In contrast, according to the embodiment of the present invention (D), the pilot pressure reaches the target value with a gentle rise. Thus, an excellent operability can be ensured while a surge in pressure is prevented by absorbing shock.

Figure 4:
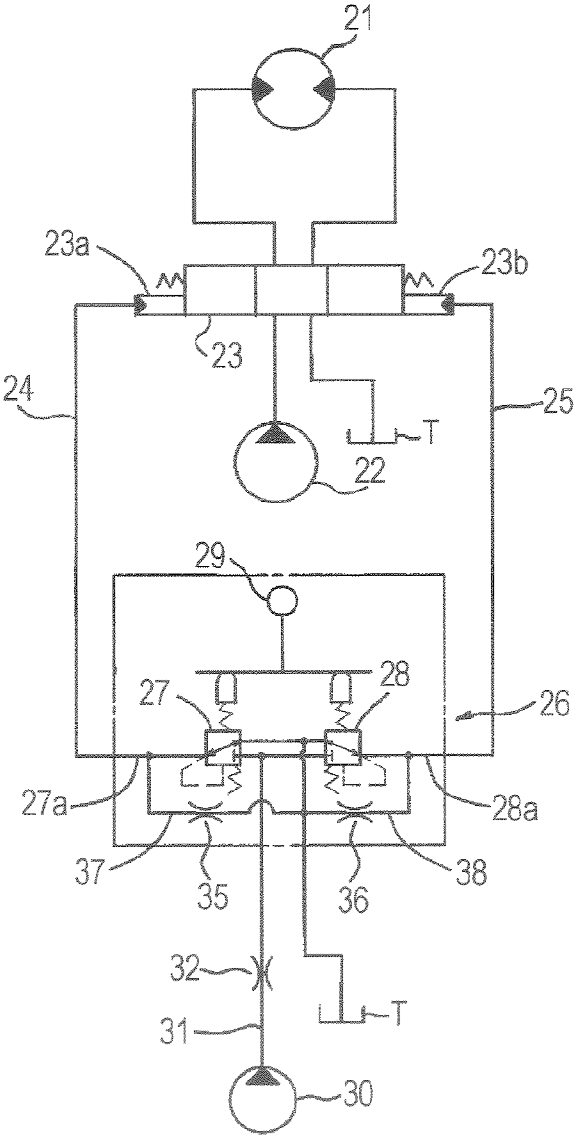
FIG. 4 is a circuit structure illustrating a second embodiment of the present invention.
Figure 5:
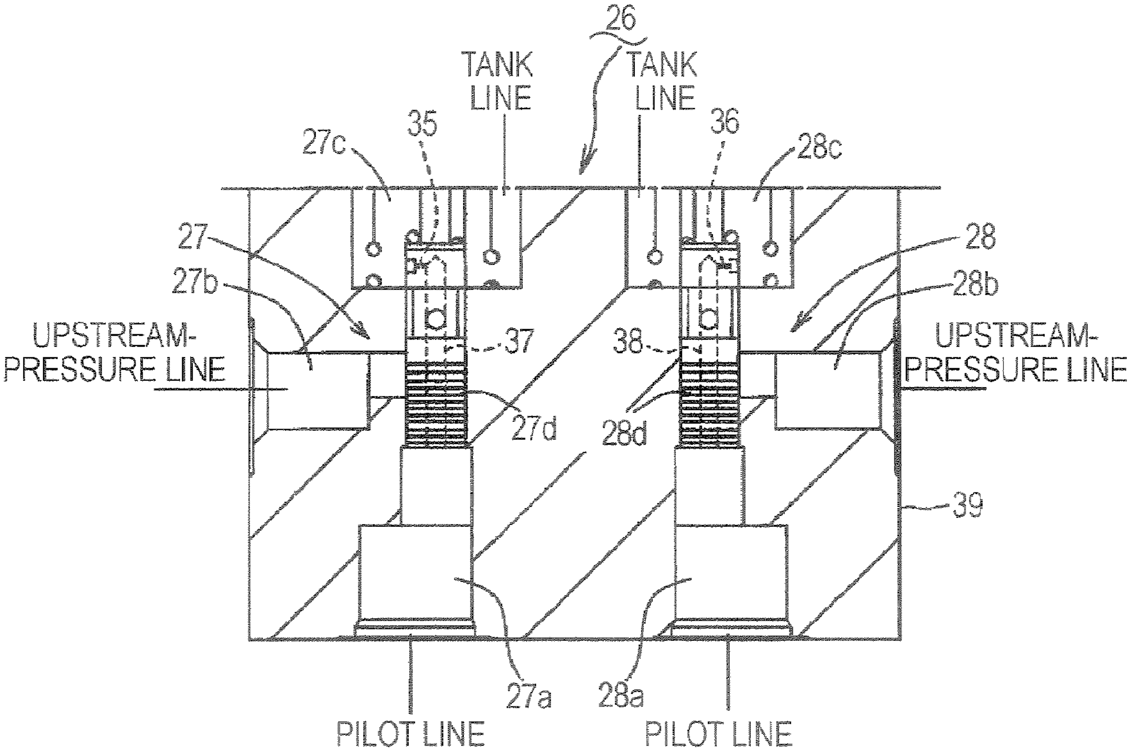
FIG. 5 illustrates a specific structure of a remote-control valve according to the second embodiment.
Figure 6:
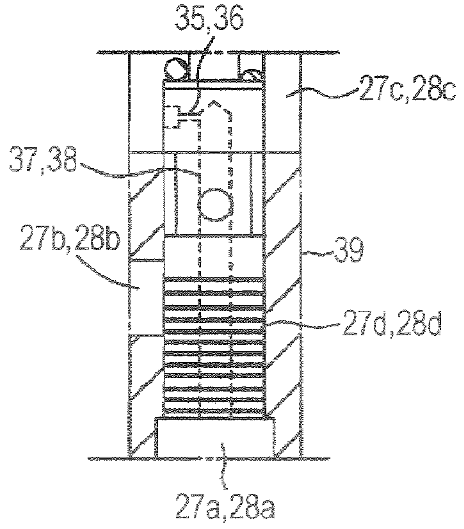
FIG. 6 is a partially enlarged view of FIG. 5.

Second Embodiment (see FIGS. 4 to 6)

Only aspects different from the first embodiment will be described in the following embodiments.

In a second embodiment, as shown in FIG. 4, internal paths 37 and 38 serving as bleed-off lines that connect the downstream-pressure lines 27*a* and 28*a* at downstream sides of the pressure-reducing valves 27 and 28, respectively, of the remote-control valve 26 with a tank line extending to a tank T are provided for the pressure-reducing valves 27 and 28, respectively. The second throttles 35 and 36 are disposed on the internal paths 37 and 38, respectively.

With this structures an excellent operability can also be ensured while surges in pressure in the pilot lines 24 and 25 are prevented by means of the first throttle 32 and the second throttles 35 and 36 in basically the same manner as in the first embodiment.

As described above, the bleed-off lines having the second throttles can be connected to the pilot lines 24 and 25 as external circuits of the pilot lines 24 and 25 as in the first embodiment, or can be provided for the pressure-reducing valves 27 and 28 as internal paths as in this embodiment.

FIGS. 5 and 6 illustrate a specific structure of this embodiment. FIG. 6 is a partially enlarged view of FIG. 5

In FIG. 5, a body 39 of the remote-control valve 26 (body including both the pressure-reducing valves 27 and 28) includes the downstream-pressure lines 27 and 28*a*, upstream-pressure lines 27*b* and 28*b* that are connected to the pump line (upstream-pressure line) 31 shown in FIG. 4, tank lines 27*c* and 28*c*, and spools 27*d* and 28*d* of the pressure-reducing valves 27 and 28, respectively. The internal paths 37 and 38 are formed in the central portions of the spools 27*d* and 28*d*, respectively.

First ends of the internal paths 37 and 38 communicate with the downstream-pressure lines 27*a* and 28*a*, respectively, and second ends of the internal paths 37 and 38 communicate with the tank lines 27*c* and 28*c*, respectively. The second throttles 35 and 36 are disposed at the second ends of the internal paths 37 and 38, respectively, adjacent to the tank lines.

The bleed-off lines (internal paths 37 and 38) having the second throttles formed inside the pressure-reducing valves 27 and 28 obviate the need for external circuits. Thus, the number of parts can be reduced and the circuit structure can be simplified compared with the first embodiment having the bleed-off lines 33 and 34 as external circuits, and furthermore, pressure loss by the bleed-off lines can be minimize.

Figure 7:
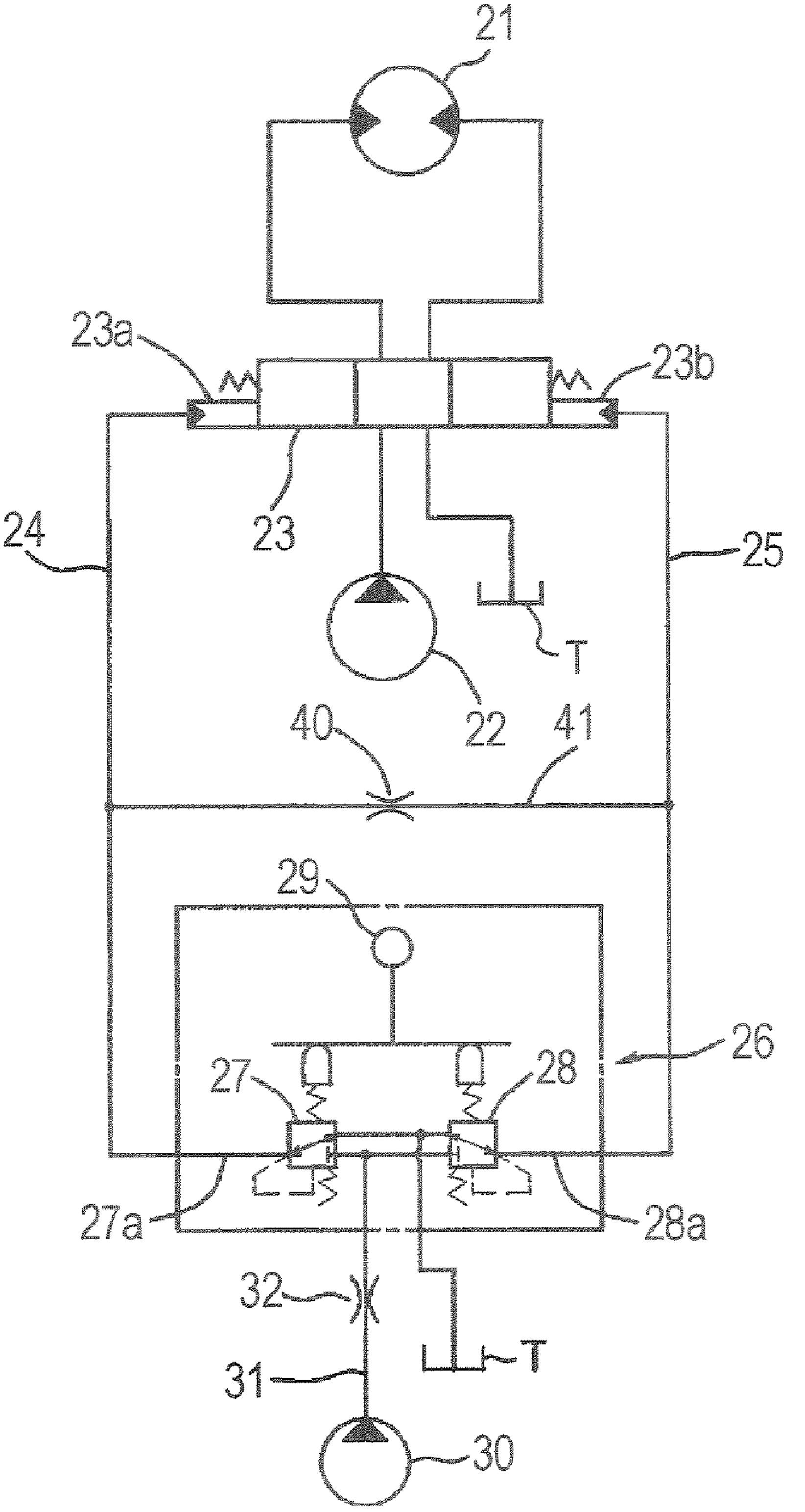
FIG. 7 is a circuit structure illustrating a third embodiment of the present invention.

Third Embodiment (see FIG. 7)

In a third embodiment, a bleed-off line 41 having a second throttle 40 is disposed between the pilot lines 24 and 25 so as to connect the pilot lines 24 and 25. This bleed-off line 41 is connected to a tank T via the pilot line and the pressure-reducing valve that are not operated during the operation of the remote-control valve 26.

For example, when the pressure-reducing valve 27 at the left side in FIG. 7 is operated, the bleed-off line 41 is connected to the tank T via the pilot line 25 and the pressure-reducing valve 28 disposed at the right side in the drawing (inoperative side).

With this, one bleed-off line 41 and one second throttle 40 are sufficient for the operation. This leads to a simplified circuit structure, easy circuit assembly, and a reduction in costs.

Figure 8:
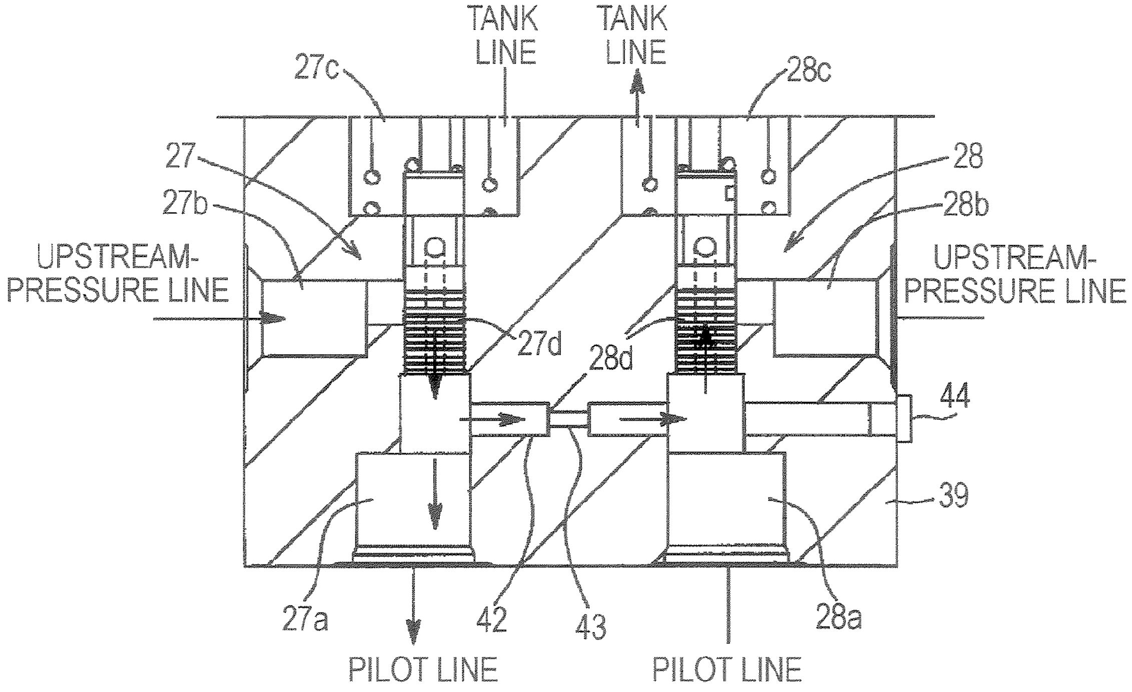
FIG. 8 is a circuit structure illustrating a fourth embodiment of the present invention.

Fourth Embodiment (see FIG. 8)

In a fourth embodiment, a bleed-off line having a second throttle is included in the remote-control valve 6 on the premise of the structure according to the third embodiment.

That is, an internal path 42 serving as a bleed-off line that connects the downstream-pressure lines 27*a* and 28*a* of the pressure-reducing valves 27 and 28, respectively, is provided in the body 39 of the remote-control valve 26, and a second throttle 43 is provided for the internal path 42. A plug 44 closes an opening that was made during forming of the internal path 42.

This structure also obviates the need for external circuits as in the second embodiment (FIGS. 4 to 6). Thus, the number of parts can be reduced and the circuit structure can be simplified, and furthermore, pressure loss can be regulated.

Figure 9:
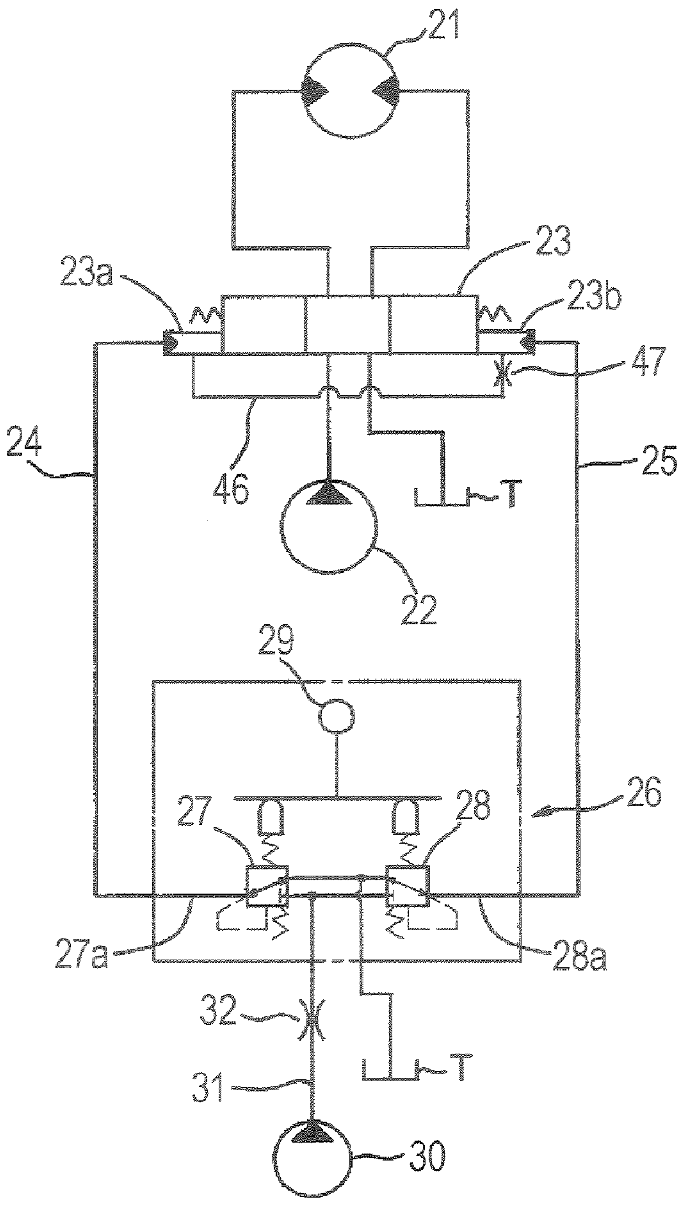
FIG. 9 is a circuit structure illustrating a fifth embodiment of the present invention.
Figure 10:
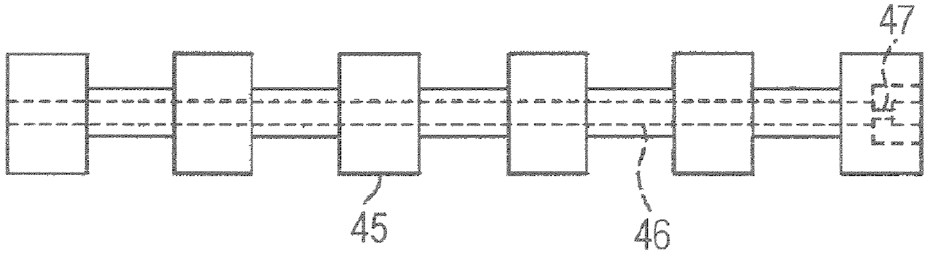
FIG. 10 illustrates the structure of a spool of a control valve according to the fifth embodiment.

Fifth Embodiment (see FIGS. 9 and 10)

FIG. 10 illustrates the structure of a spool of the control valve 23 shown in FIG. 9.

In a fifth embodiment, an internal path 46 serving as a bleed-off line that connects the pilot ports of the control valve 23 is formed in a spool 45 of the control valve 23, and a second throttle 47 is provided for the internal path 46 (at an end in the drawing).

This structure can also produce an effect equal to the fourth embodiment.

The internal path 46 can be formed in a body of the control valve 23.

Figure 11:
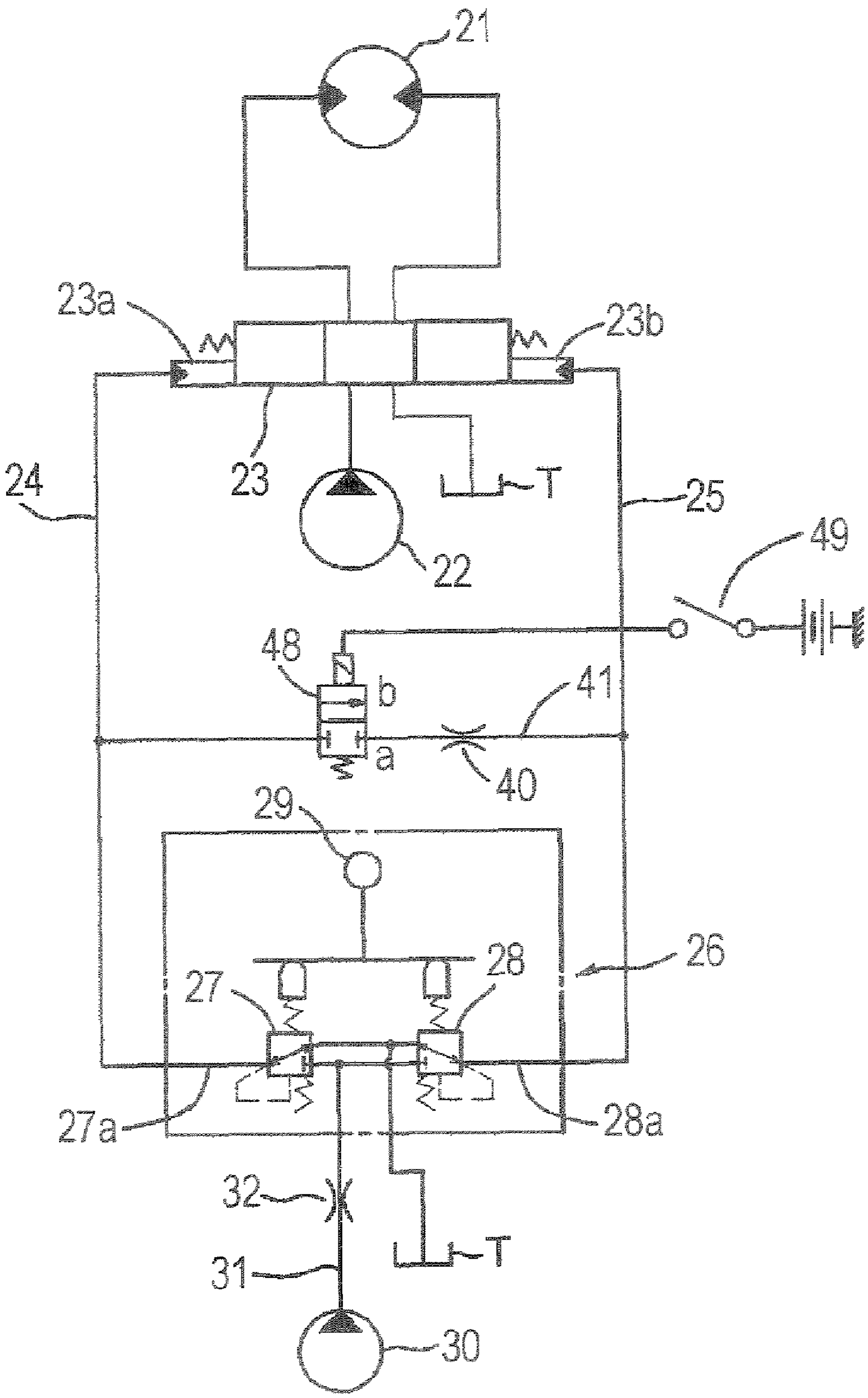
FIG. 11 is a circuit structure illustrating a sixth embodiment of the present invention.

Sixth Embodiment (see FIG. 11)

In some cases, shock-absorption function by means of both the first and second throttles is not required, or preferably, the absence of the shock-absorption function may be required depending on operator's preference, work breakdown, or the like (for example, for work that requires impulsive force such as slope tamping where a ground surface is struck by a bucket of a hydraulic shovel).

Therefore, in a sixth embodiment, operativeness/inoperativeness of the shock-absorption function can be selected.

For example, on the premise of the structure according to the third embodiment shown in FIG. 7, that is, the structure having the bleed-off line 41 with the second throttle 40 disposed between the pilot lines 24 and 25, an electromagnetic switching valve 48 serving as selecting means for selecting operativeness/inoperativeness of the second throttle 40 is disposed on the bleed-off line 41.

This electromagnetic switching valve 48 is switched from a closed position a to an opening position b shown in the drawing when a switch 49 is turned on. In this state, the bleed-off line 41 is open, and the shock-absorption function by means of the second throttle 40 becomes operative.

Therefore, when the shock-absorption function is not required the switch 49 can be turned off such that the electromagnetic switching valve 48 is switched to the closed position a so as to close the bleed-off line 41.

In this embodiments the selecting means is applied to the structure according to the third embodiment. However, the selecting means can be applied to structures according to the other embodiments for selecting the operativeness/inoperativeness of at least one of the first and second throttles.

With this structures desired operability of the hydraulic circuit according to operator's preference, work breakdown, or the like can be obtained.

Figure 12:
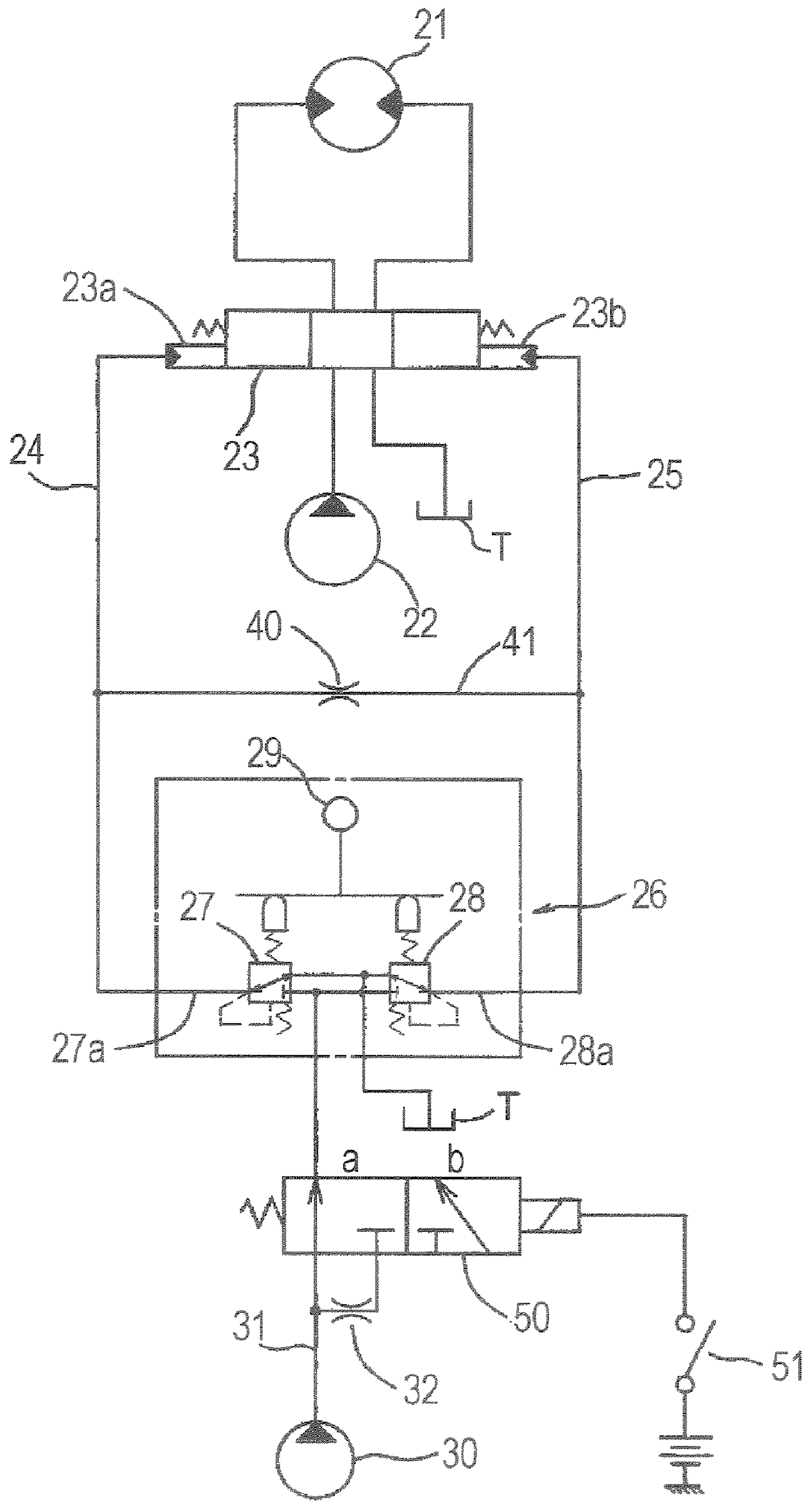
FIG. 12 is a circuit structure illustrating a seventh embodiment of the present invention.

Seventh Embodiment (see FIG. 12)

In the sixth embodiment, the operativeness/inoperativeness of the shock-absorption function of the second throttle 40 can be selected. In contrast, in a seventh embodiment an electromagnetic switching valve 50 serving as selecting means is disposed on the pump line 31 of the pilot pump 30. The electromagnetic switching valve 50 is switched between an inactive position a at the left side in the drawing for separating the first throttle 32 from the pump line 31 and an active position b at the right side for connecting the first throttle 32 with the pump line 31 in response to on-off operation of a switch 51 such that the operativeness/Inoperativeness of the shock-absorption function of the first throttle 32 (reduction in the upstream pressure) is selected.

The sixth and seventh embodiments can be combined such that the operativeness/inoperativeness of the shock-absorption function of both the first throttle 32 and the second throttle 40 can be selected.

Moreover, the structures according to the sixth and seventh embodiments in which the throttling function can be selected can also be applied to those according to the first, second, fourth, and fifth embodiments.

Figure 13:
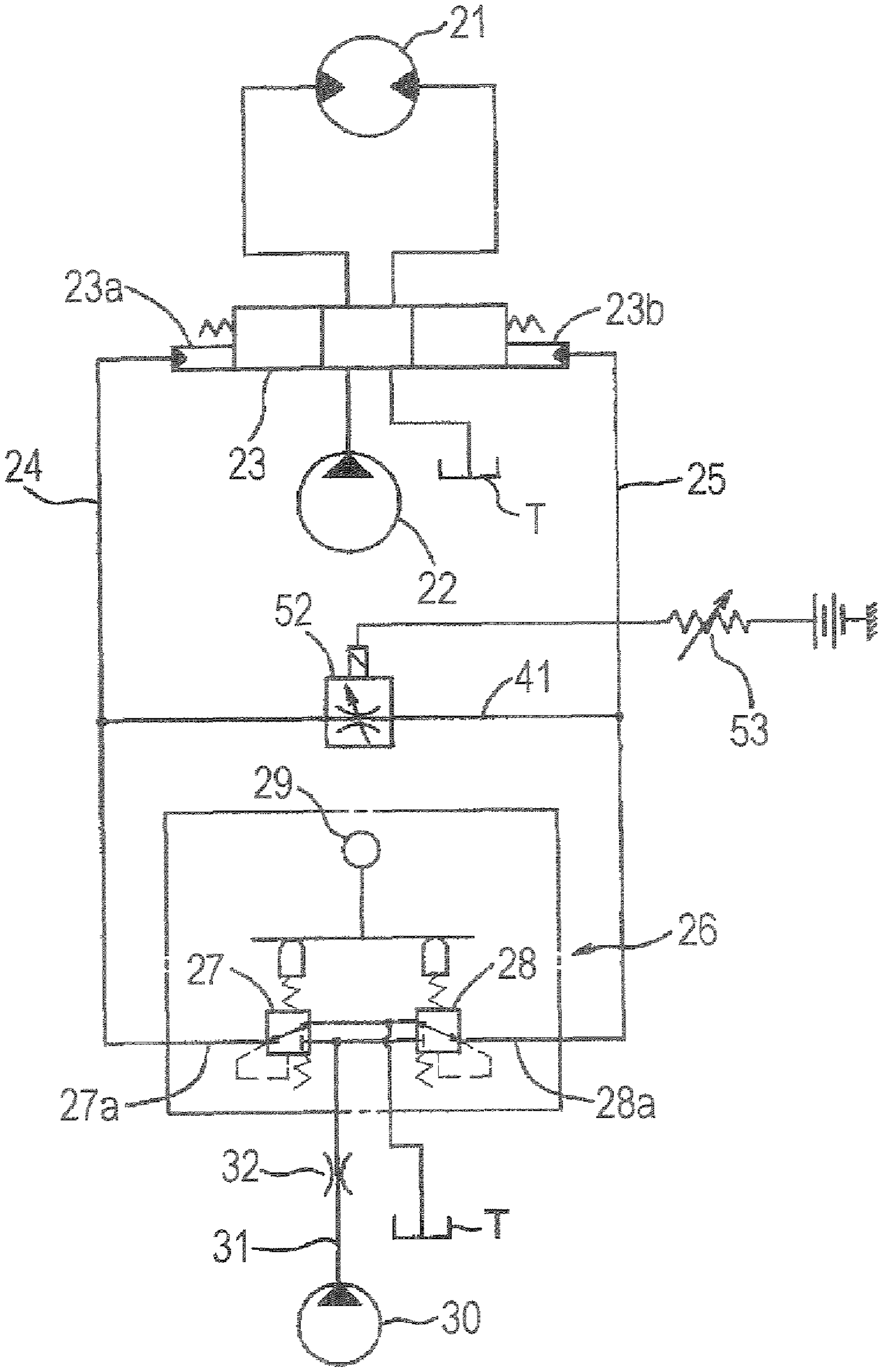
FIG. 13 is a circuit structure illustrating an eighth embodiment of the present invention.

Eighth Embodiment (see FIG. 13)

In an eighth embodiment, on the premise of the structure according to the third embodiment shown in FIG. 7 for example, a second throttle 52 having a variable opening area is disposed on the bleed-off line 41. The second throttle 52 is of the electromagnetic type whose opening area is continuously changed according to electrical signals, and the opening area of this variable second throttle 52 is controlled by a variable resistance 53 serving as controlling means.

With this structure, the degree (strength) of shock-absorption function of the second throttle 52 can be arbitrarily adjusted, resulting in an excellent operability depending on operator's preference, work breakdown, or the like.

The structure for adjusting the throttling function according to the eighth embodiment can also be applied to the first throttle. Moreover, the structure can also be applied to the embodiments other than the third embodiment.

Furthermore, the variable reducing valve can be manually operated.

Figure 14:
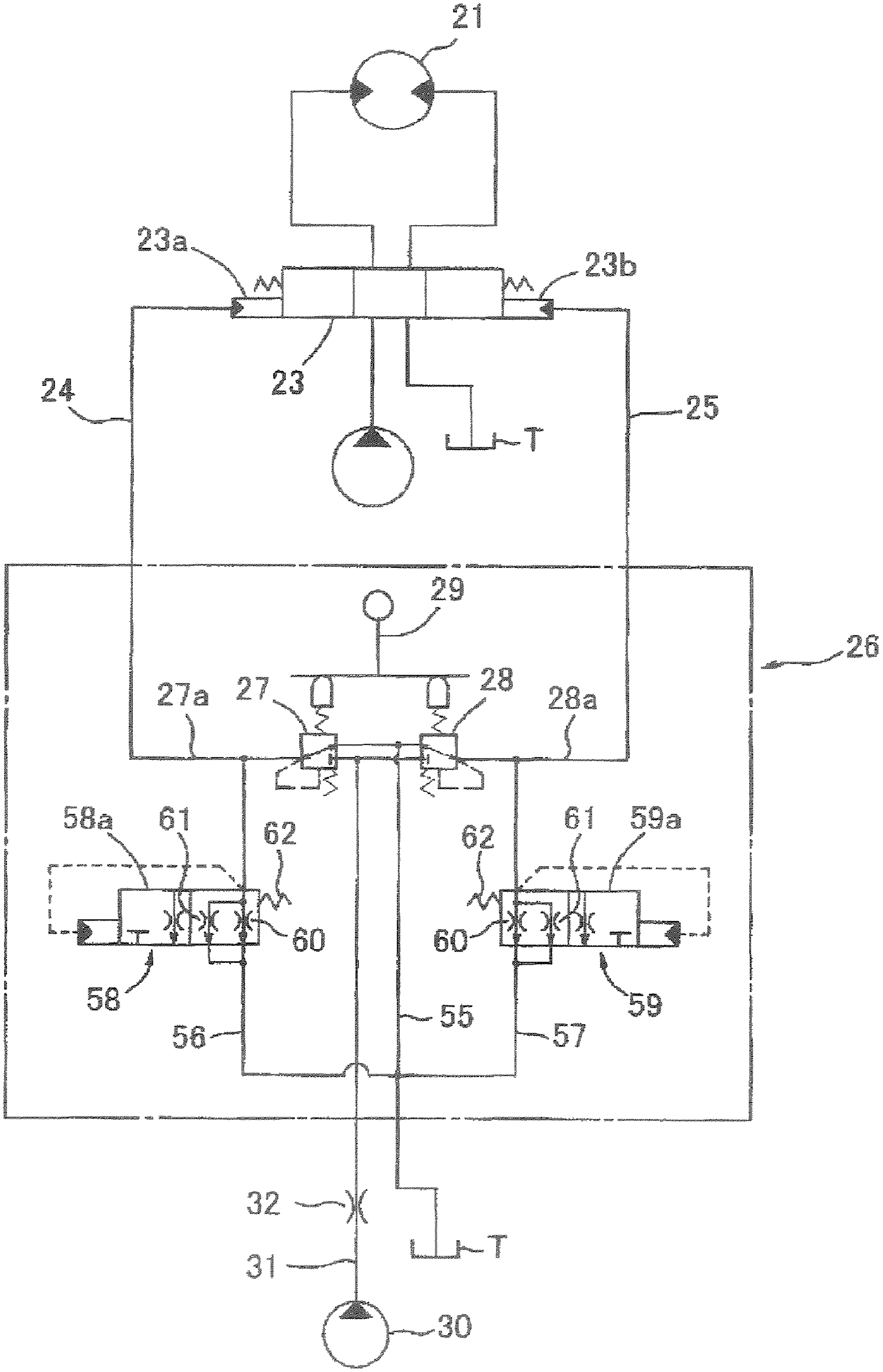
FIG. 14 is a circuit structure illustrating a ninth embodiment of the present invention.
Figure 15:
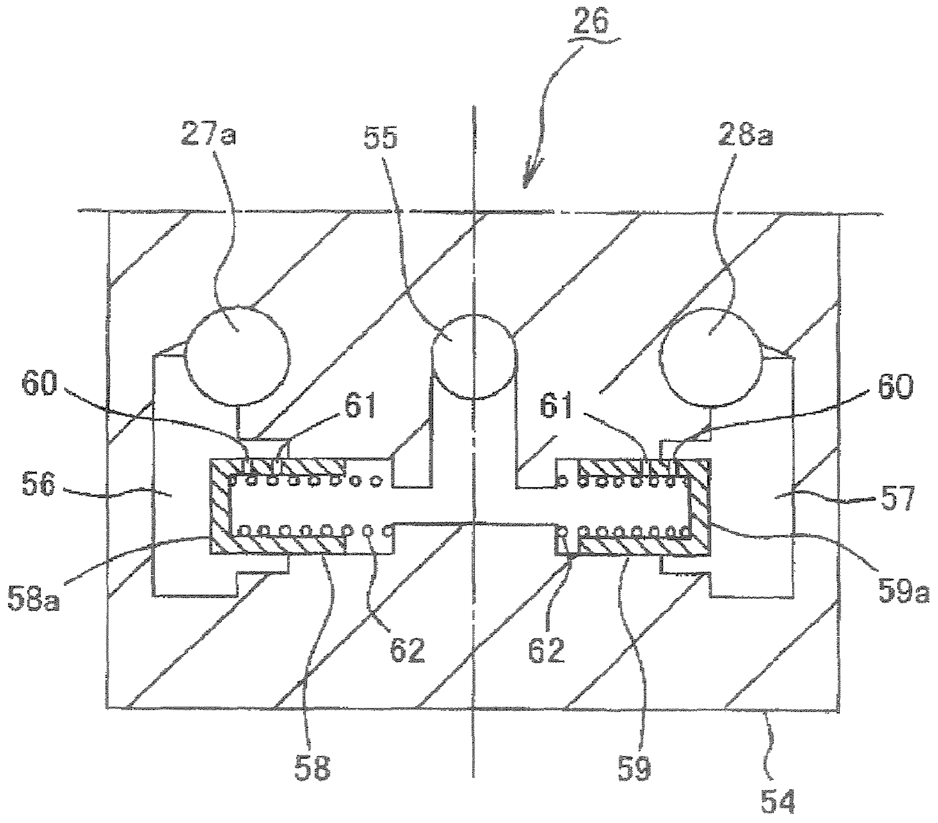
FIG. 15 illustrates a specific structure of a remote-control valve according to the ninth embodiment.
Figure 16:
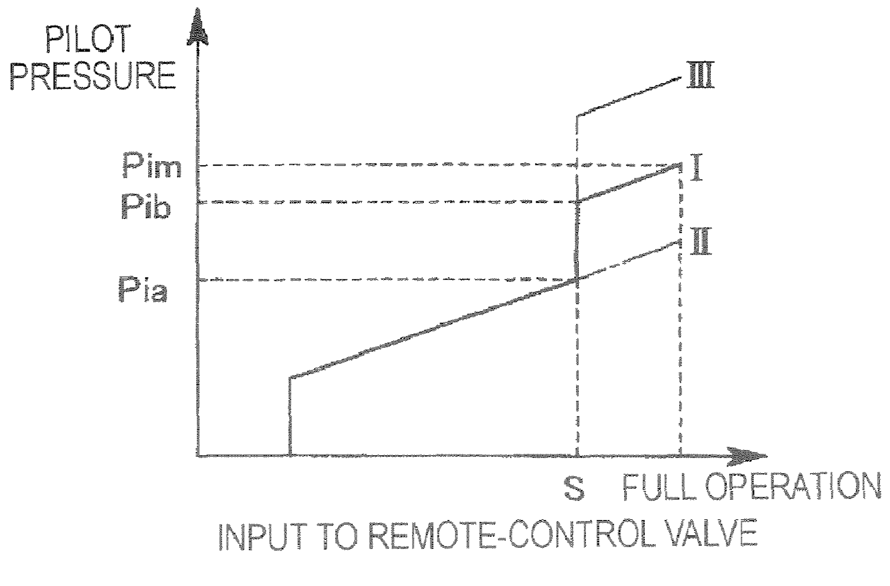
FIG. 16 illustrates the relationship between an operation amount of the remote-control valve according to the ninth embodiment and a pilot pressure.

Ninth Embodiment (see FIGS. 14 to 16)

In a ninth embodiment, the structure according to the second embodiment in which the second throttles are included in the remote-control valve and the structure according to the eighth embodiment in which the second throttle has a variable reducing valve are combined, and applied to second throttles according to this embodiment.

That is, as shown in FIGS. 14 and 15, internal paths 56 and 57 serving as bleed-off lines that connect the downstream-pressure lines 27*a* and 28*a*, respectively, with a tank line 55 are provided for a body 54 of the remote-control valve 26. Throttle valves 58 and 59 of the hydraulic pilot type serving as the second throttles are disposed on the internal paths 56 and 57, respectively.

Spools 58*a* and 59*a* of the respective throttle valves 58 and 59 each have a first opening 60 and a second opening 61 with a spacing therebetween in a stroke direction, and reciprocate between positions where both the openings 60 and 61 are opened at the same time and positions where the first openings 60 are opened and the second openings 61 are closed using the downstream pressures of the pressure-reducing valves 27 and 28.

The opening areas of the openings 60 and 61 are identical or substantially identical to each other.

FIG. 16 illustrates the relationship between the operation amount of the remote-control valve 26 and the pilot pressure supplied to the control valve 23, i.e., how the pilot pressure is changed in response to the operation of the throttle valves 58 and 59.

In the drawing, S denotes an operation amount of the remote-control valve when the second opening 61 is closed while the first opening 60 is open, and Pia denotes a pilot pressure at this time. As indicated by a thick line I, when the operation amount of the remote-control valve 26 reaches the point S, the pilot pressure jumps up from Pia to Pib, and then is increased up to the maximum value Pim for full operation in response to the operation amount.

The characteristic II indicated by an alternately long and short dashed line shown in the drawing illustrates the case when both the openings 60 and 61 are kept open until the full operation, and the characteristic III indicated by a two-dot chain line illustrates the case when both the openings 60 and 61 are closed at the point S.

As is clear from the comparison of these three characteristics I, II, and III, the pilot pressure is rapidly increased to a value higher than Pim at the moment of closing the second opening 61 in the case of the characteristic III. This can cause a sudden change in operation of the control valve 23 and thus can cause a shock to the operation of the actuator.

On the other hand, in the case of the characteristic II, the control valve 23 may not be fully switched due to the absolute value of the pilot pressure during the full operation being too small. With this, in a circuit for a traveling section of the hydraulic shovel, for example, a bleed-off path of the control valve may not be fully closed, resulting in variations in control systems of driving motors for left and right traveling sections. Thus, oil supply to both driving motors becomes imbalanced, and straight-ahead driving cannot be maintained.

In contrast, according to this embodiments the opening area of the second opening 61 is reduced in response to the operation amount of the remote-control valve, and only the first opening 50 is kept open during the full operation. Therefore, shock caused by a sudden increase in the pilot pressure as in the case of full closing (characteristic III) can be avoided.

Moreover, only the first opening 60 is open from the point S to the full operation, and the opening areas of the throttle valves (second throttles) 58 and 59 are not zero but sufficiently small. Thus, a sufficient pilot pressure can be ensured during the full operation. Therefore, unlike the case where the opening area is invariable (characteristic II), a sufficient pilot pressure can be ensured during the full operation, and the control valve 23 can be fully switched.

Figure 17:
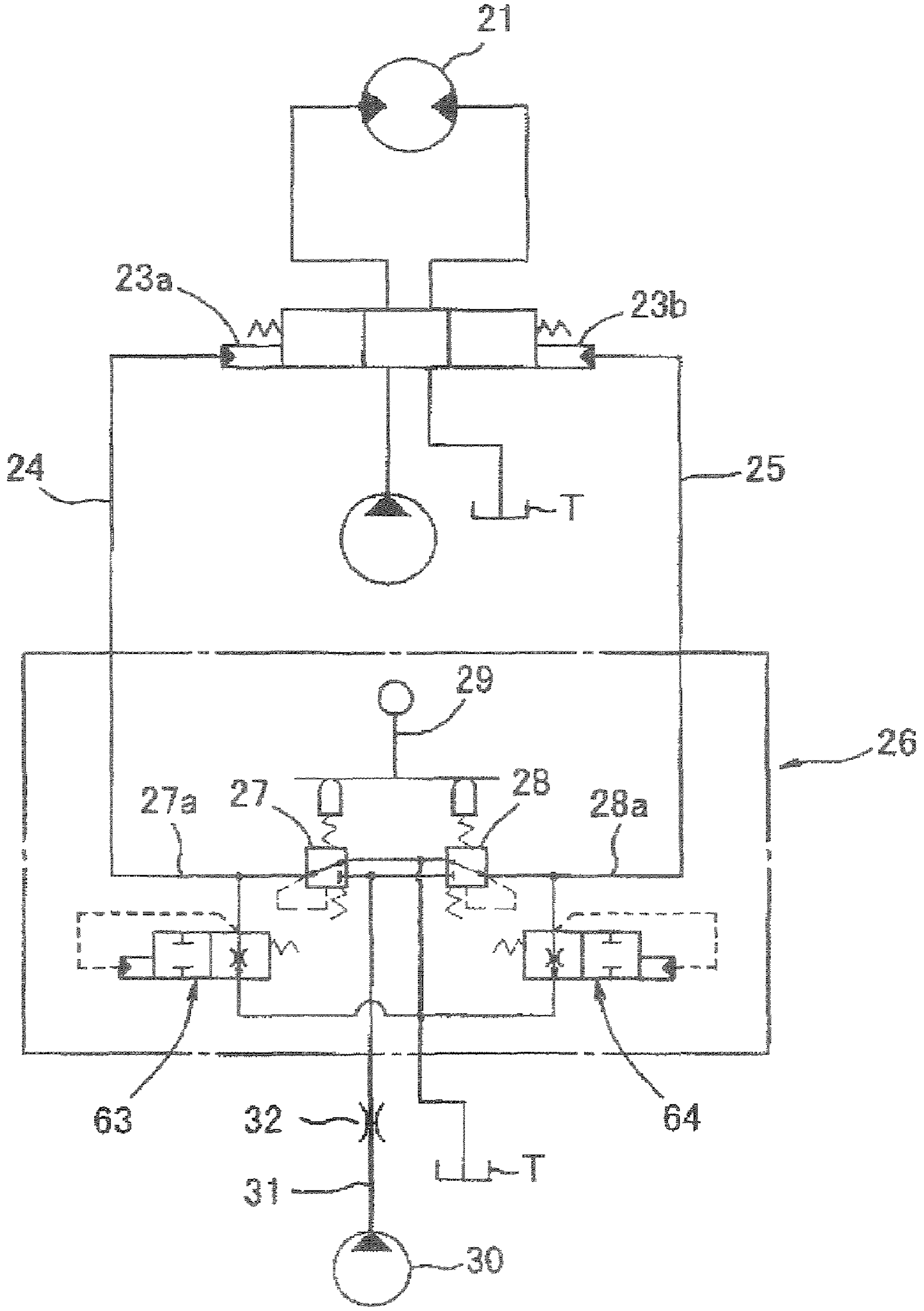
FIG. 17 is a circuit structure illustrating a tenth embodiment of the present invention.

Tenth Embodiment (see FIG. 17)

In a tenth embodiments which is a modification of the ninth embodiment having the second throttles that are included in the remote-control valve and have variable reducing valves, throttle valves 63 and 64 serving as the second throttles are fully closed during the full operation of the remote-control valve 26.

This structure exhibits the characteristic III shown in FIG. 16, and has a lower operability compared with the ninth embodiment. However, a sufficient pilot pressure can be advantageously supplied to the control valve 13 during the full operation.

In the above-described embodiments, the present invention is applied to the hydraulic circuit including the control valve that has the pilot ports at either end thereof. However, the present invention can also be applied to a hydraulic circuit including a control valve that has only one pilot port at one end thereof, the hydraulic circuit driving a unidirectional rotary motor used for a special attachment or a single acting cylinder for a breaker.

In this case, a first throttle can be disposed upstream of a pressure-reducing valve, and a second throttle can be disposed on a bleed-off line that connects a pilot line with a tank, the pilot line connecting the pressure-reducing valve with the above-described pilot port.

INDUSTRIAL APPLICABILITY

According to the present invention, a useful effect of preventing shock generation during quick operation can be produced while preventing detrimental effects such as deterioration of operability and a harmful influence on the other pilot circuits.

The invention claimed is:

1. A hydraulic circuit for a construction machine comprising:

a hydraulic actuator;

a control valve of a hydraulic pilot type, the control valve controlling the operation of the hydraulic actuator;

at least one pilot line guiding a pilot pressure to at least one pilot port of the control valve;

at least one pressure-reducing valve supplying a secondary pressure according to an operation amount of operating means to the pilot line as the pilot pressure;

a pilot hydraulic source serving as a primary-pressure source of the pressure-reducing valve;

a pump line supplying the primary pressure from the pilot hydraulic source, without bleed-off for pressure limitation, to the at least one pressure-reducing valve;

a first throttle disposed upstream of the pressure-reducing valve for reducing the primary pressure that is supplied from the pilot hydraulic source to the pressure-reducing valve;

a bleed-off line connected to the at least one pilot line and connecting the pilot line with a tank; and a second throttle disposed in the bleed-off line for moderating a rise in the pilot pressure that is supplied to the pilot port of the control valve.

* * * * *